(12) United States Patent
Varakur et al.

(10) Patent No.: US 9,448,966 B2
(45) Date of Patent: Sep. 20, 2016

(54) SYSTEM AND METHOD FOR CREATING HIGHLY SCALABLE HIGH AVAILABILITY CLUSTER IN A MASSIVELY PARALLEL PROCESSING CLUSTER OF MACHINES IN A NETWORK

(71) Applicant: FutureWei Technologies, Inc., Plano, TX (US)

(72) Inventors: Gangavara Prasad Varakur, Danville, CA (US); Anil Chillarige, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 223 days.

(21) Appl. No.: 13/871,276

(22) Filed: Apr. 26, 2013

(65) Prior Publication Data

US 2014/0325182 A1    Oct. 30, 2014

(51) Int. Cl.
*G06F 15/173* (2006.01)
*G06F 15/80* (2006.01)

(52) U.S. Cl.
CPC ..................................... *G06F 15/80* (2013.01)

(58) Field of Classification Search
USPC ........................................................ 714/4.12
See application file for complete search history.

(56) References Cited

U.S. PATENT DOCUMENTS

| | | | |
|---|---|---|---|
| 5,224,100 A | | 6/1993 | Lee et al. |
| 6,718,486 B1* | | 4/2004 | Roselli et al. ................... 714/41 |
| 7,464,378 B1* | | 12/2008 | Limaye ................. G06F 9/5061 |
| | | | 714/100 |
| 7,552,122 B1* | | 6/2009 | Georgiev |
| 7,913,105 B1* | | 3/2011 | Ganesh et al. ................. 709/224 |
| 8,185,776 B1* | | 5/2012 | Gentes et al. ................ 714/4.11 |
| 8,615,599 B1* | | 12/2013 | Takefman ............... H04L 45/18 |
| | | | 709/236 |
| 2003/0177411 A1* | | 9/2003 | Dinker et al. ................... 714/13 |
| 2005/0080781 A1* | | 4/2005 | Ryan et al. ....................... 707/5 |
| 2006/0053216 A1* | | 3/2006 | Deokar et al. ................ 709/223 |
| 2007/0180288 A1 | | 8/2007 | Okada et al. |
| 2008/0222140 A1* | | 9/2008 | Lagad et al. ...................... 707/5 |
| 2012/0239612 A1* | | 9/2012 | George et al. ................ 707/602 |

(Continued)

FOREIGN PATENT DOCUMENTS

| | | |
|---|---|---|
| CN | 1987804 A | 6/2007 |
| CN | 101211282 A | 7/2008 |

(Continued)

OTHER PUBLICATIONS

International Search Report received in Application No. PCT/CN2014/076013, mailed Jul. 23, 2014, 15 pages.

*Primary Examiner* — Kamini Patel
(74) *Attorney, Agent, or Firm* — Slater Matsil, LLP

(57) ABSTRACT

System and method embodiments are provided to implement highly scalable and high availability (HA) clusters in massively parallel processing (MPP) systems. The embodiments include a method to build a highly scalable MPP HA cluster, which provides HA to the cluster while allowing it to scale to relatively larger number of nodes. An embodiment apparatus includes a plurality of data processing nodes distributed in a plurality of corresponding sub-clusters and configured to exchange heart-beat messages between each other within limit of each of the corresponding sub-clusters to maintain sub-cluster membership integrity and detect failures in the corresponding sub-clusters. The sub-clusters are arranged in a fan-out tree hierarchy and configured to prevent heart-beat messaging between each other.

21 Claims, 7 Drawing Sheets

(56) References Cited

U.S. PATENT DOCUMENTS

2012/0259818 A1* 10/2012 Gjertsen et al. .............. 707/674
2013/0227359 A1* 8/2013 Butterworth ................... 714/57
2014/0006871 A1* 1/2014 Lakshmanan et al. ......... 714/37
2014/0149783 A1* 5/2014 Georgiev ...................... 714/4.2

FOREIGN PATENT DOCUMENTS

| CN | 102045196 A | 5/2011 |
| CN | 102882973 A | 1/2013 |
| WO | 9926148 A2 | 5/1999 |

* cited by examiner

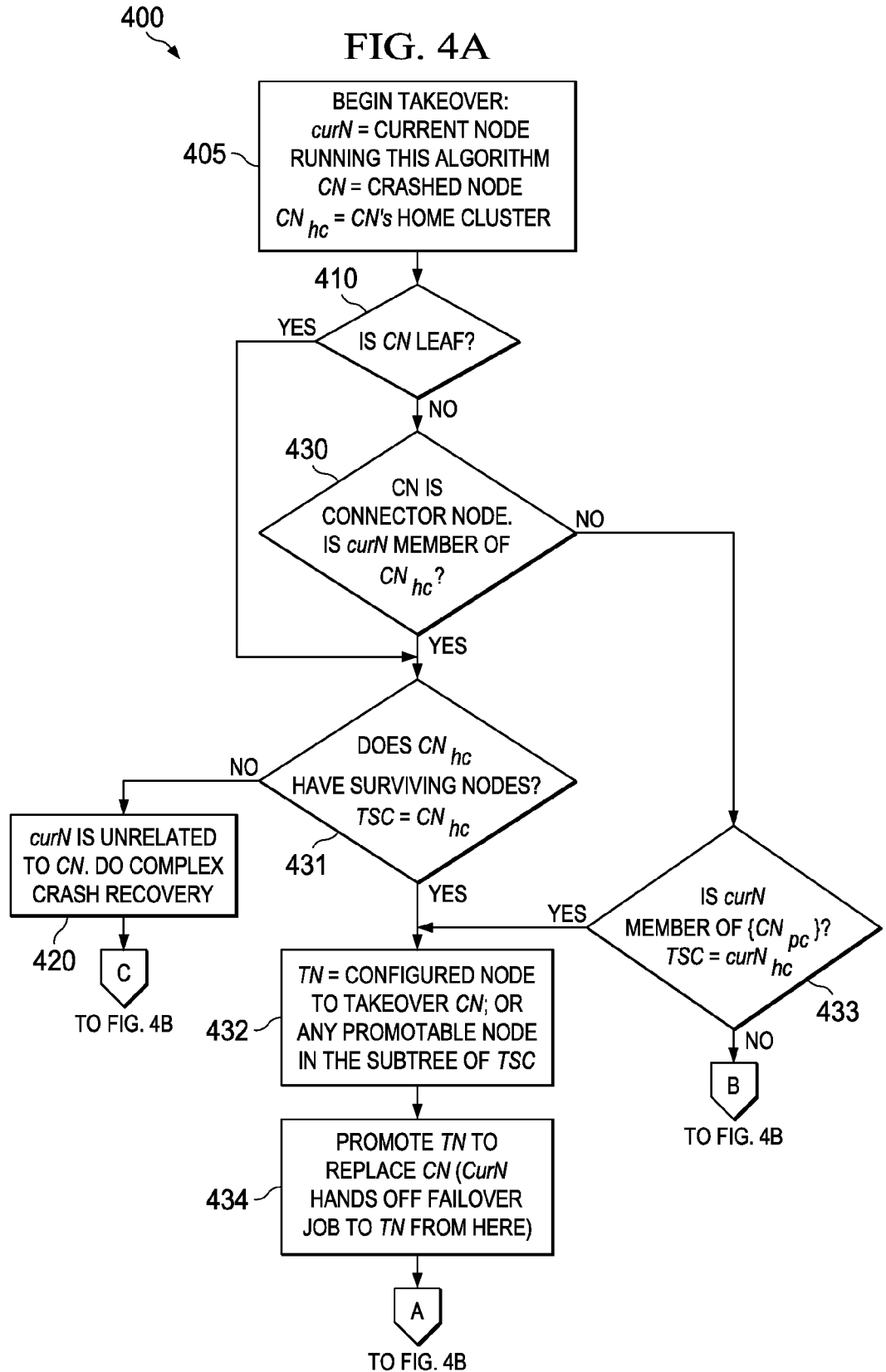

SYSTEM AND METHOD FOR CREATING HIGHLY SCALABLE HIGH AVAILABILITY CLUSTER IN A MASSIVELY PARALLEL PROCESSING CLUSTER OF MACHINES IN A NETWORK

TECHNICAL FIELD

The present invention relates to distributed processing and computing, and, in particular embodiments, to a system and method for creating highly scalable high availability cluster in a massively parallel processing cluster of machines in a network.

BACKGROUND

A massively parallel processing (MPP) system allows an administrator to distribute data for distributed computing applications to a number of processors, called partitions or data nodes. For example a MPP database system allows distributing database data to multiple data nodes for query processing in a parallel and distributed manner. The concept of MPP is the coordinated processing of a program by multiple processors, with each processer working on different parts of the program. The processors communicate with one another to complete a task, with each of them using its own operating system and memory resources. Typically, MPP systems are built to scale to large number of data nodes, but they have limited high availability, a term used to reflect the characteristic of the system to continue running and handle failures with minimum planned or unplanned down-time or without requiring administrative intervention. Such systems allow the administrator to create a simplistic high availability cluster, which typically employs a two-tier master-slave setup of nodes or one-tier equal-peers notion, or may not even provide proactive monitoring of various components for failures. There is a need for an improved high availability cluster architecture that is also highly scalable.

SUMMARY OF THE INVENTION

In accordance with an embodiment, a method for providing a massively parallel processing (MPP) cluster of processing nodes includes dividing the MPP cluster into a plurality of sub-clusters, arranging the sub-clusters into a fan-out tree hierarchy, and exchanging heart-beat messages between the processing nodes in each of the sub-clusters to maintain cluster membership integrity of the processing nodes in each of the sub-clusters.

In accordance with another embodiment, a method for failure recovery in a MPP cluster of processing nodes includes detecting a failure of a first processing node in a first sub-cluster from or a plurality of sub-clusters of the MPP cluster that are coupled to each other in a tree-like topology, selecting to take over operations of the first processing node a second processing node in the first sub-cluster or a second sub-cluster from the sub-clusters that is coupled to the first sub-cluster, and removing the first processing node from the first sub-cluster.

In accordance with yet another embodiment, an apparatus for a MPP cluster of processing nodes includes a plurality of data processing nodes distributed in a plurality of corresponding sub-clusters and configured to exchange heart-beat messages between each other within limit of each of the corresponding sub-clusters to maintain sub-cluster membership integrity and detect failures in the corresponding sub-clusters, wherein the sub-clusters are arranged in a fan-out tree hierarchy and configured to prevent heart-beat messaging between each other.

BRIEF DESCRIPTION OF THE DRAWINGS

For a more complete understanding of the present invention, and the advantages thereof, reference is now made to the following descriptions taken in conjunction with the accompanying drawing, in which:

FIGS. 4A and 4B illustrate an embodiment of a method for taking over a crashed node;

DETAILED DESCRIPTION OF ILLUSTRATIVE EMBODIMENTS

Figure 1:
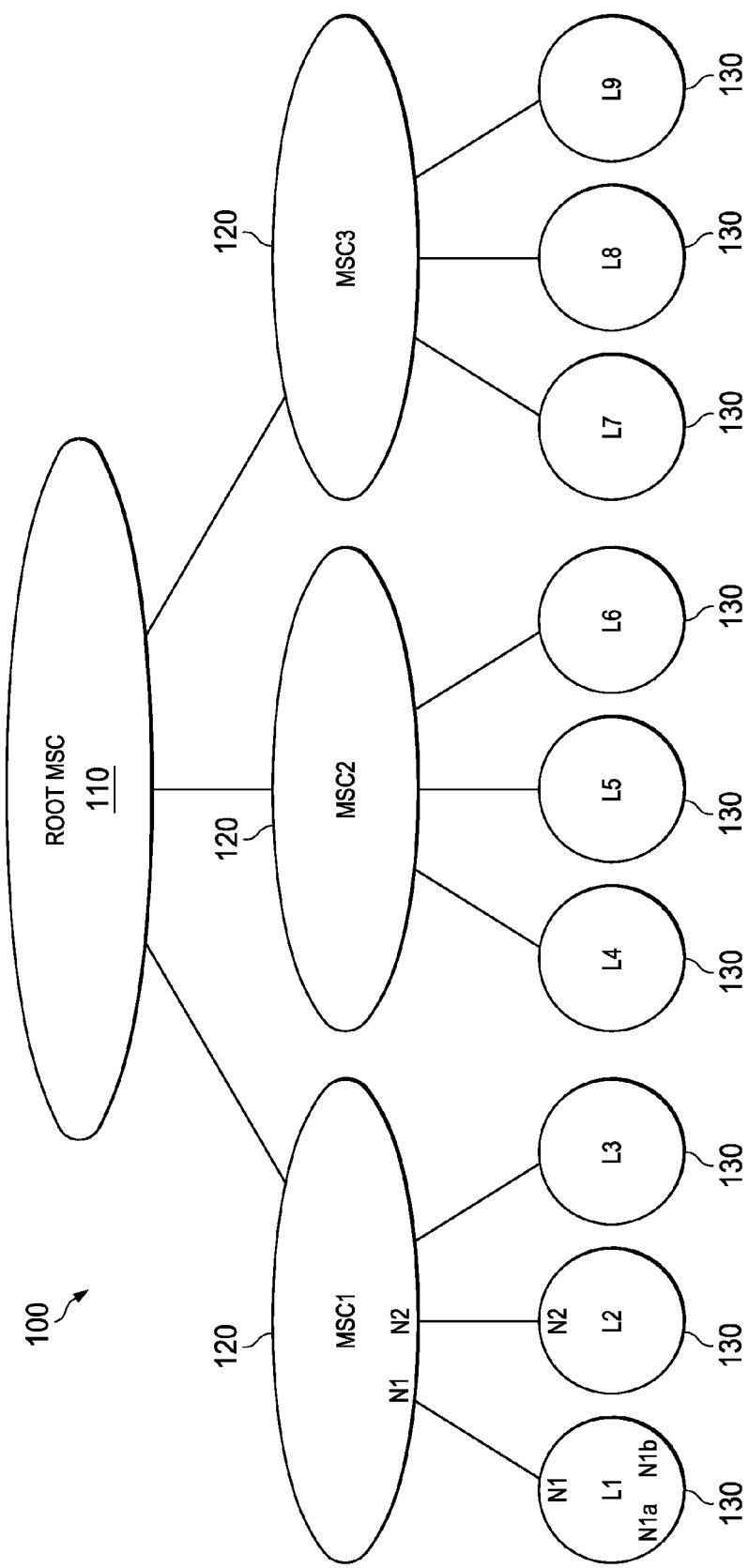
FIG. 1 illustrates an embodiment of a cluster topology with sub-cluster hierarchy.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Traditional MPP database systems focus on analytical applications that have relatively lower availability requirement and employ simple data distribution models. More current MPP database systems extend the MPP architecture to support transaction processing applications and other applications that need further high availability. The term high availability is used herein to refer to a system's high resiliency and capability to handle failures or process faults with minimum down-time and manual or administrative intervention to ensure that the overall system is operating properly. A MPP system includes a cluster subsystem as foundation to provide high availability to the upper layer software programs (such as database/application servers or applications) running in the cluster environment. Providing both scalability of the cluster (in terms of number of nodes) and high availability (HA) is a challenge. Typically, this is addressed by favoring one or the other, such as in commercially available MPP clusters. Due to the difficulty in balancing between the two, HA clusters can have limited scalability, and highly scalable clusters can have limited availability.

For example, some current MPP systems allow an administrator to create three types of HA clusters, based on the expense of heart-beating in the cluster and its impact on scalability of the cluster. A heart-beat (HB) is the active messaging/probing among various cluster components and nodes to proactively discover faulty components (processors/nodes/storage/network) in the MPP system. The three models of HA clusters can be executed by a component in the MPP system, e.g., at a Cluster Membership Layer (CML).

The models of HA clusters include loosely coupled clusters. In this model, the CML is not defined or has substantially limited role in maintaining the cluster. If the CML is not defined, then the cluster is similar to a federated system where all cluster nodes may not know about the existence of all other nodes in the cluster. However, applications running on certain nodes may have knowledge about a subset of other nodes in the cluster depending on the applications need to communicate/coordinate with these nodes. If the CML is defined, it may know about all nodes in the cluster, but there is no active heart-beating. In either case, as there is no HB, faulty components are discovered when the application on one node tries to access these components/nodes. Typically, no recovery is defined, and an error condition is raised to the administrator to recover and restore the MPP system's integrity. In some cases, the applications may implement ad-hoc recovery mechanisms specific to that application, e.g., for some error conditions. As there is minimal CML overhead, this model provides highest degree of scalability (in comparison to the other models).

Another model is master-slave clusters. In this model, the cluster membership responsibility is assigned to one or two master-nodes, and regular heart-beating takes place between master node(s) and slave nodes only. In such system, slave nodes do not send any heart-beat messages among themselves, and only master nodes are involved in cluster membership decisions. This kind of a cluster setup is scalable as the heart-beating is limited to master-to-slave nodes. However, this model provides limited HA as the existence of the whole cluster is dependent on one or two master node(s). Increasing number of masters in the cluster does not solve the problem, as it hurts scalability and performance due to the additional messaging introduced to keep all masters synchronized. This method provides higher degree of HA than the loosely coupled clusters, while retaining cluster scalability. The MPP systems that employ this method can scale to a few thousands of nodes.

The third mode is tightly coupled clusters. In such clusters, all nodes are considered equal and they all send heart-beat messages to each other to maintain the integrity of the cluster membership. Such a system has more messaging traffic within the cluster, and uses more complex algorithms to maintain the cluster integrity. This type of cluster provides highest levels of availability (than the other models), but has limitations in scaling to larger cluster sizes. Commercial clusters are available that can scale up to about 128 nodes but practical deployments are limited to smaller numbers (e.g., 8 nodes).

System and method embodiments are provided to implement highly scalable and HA clusters in MPP systems, such as Network of Workstations (NoWs), cluster of machines, or Cloud/Farm infrastructures. The embodiments include a method to build a highly scalable MPP HA cluster, which provides HA to the cluster while allowing it to scale to relatively larger number of nodes. The embodiments also include provisions to integrate such a highly scalable HA cluster with MPP applications such as Database Management Systems to achieve optimal levels of performance, scalability, and availability. The method can be used to build a highly scalable HA Cluster (HSHAC) for both shared-disk and shared-nothing or hybrid architectures.

The highly scalable HA cluster has a plurality of characteristics. The characteristics include avoiding a single point of failure (SPOF) of any component. Such SPOF components are highly undesirable in a system with a goal of high availability or reliability. Another characteristic of the cluster is providing substantially high availability. This means that the cluster is expected to be up and running and servicing the hosted applications as long as there is at least one or a pre-determined minimum number of live node(s) in the cluster. However, the application may have reduced or limited performance and throughput when multiple nodes or components of the cluster fail. Another characteristic is high scalability in terms of cluster size. This means that the cluster is expected to be able to scale to large number of nodes, while providing the high degree of HA. The highly scalable HA cluster also provides flexibility in balancing run-time performance and failover recovery. The current three models of HA clusters described above do not meet all the characteristics of the highly scalable HA cluster.

In an embodiment, a method to build a HA cluster that is also highly scalable by arranging nodes of the cluster in hierarchical structures. At a first layer, the cluster can be viewed as a collection of smaller tightly coupled sub-clusters. Being tightly coupled (as described below), each sub-cluster can provide substantially or sufficiently high availability within the sub-cluster. Such a sub-cluster is referred to herein as a Leaf Sub-Cluster (LSC) or leaf, in short. A second layer of meta sub-clusters are superimposed on top of the leaf clusters to form intermediary nodes of the hierarchy. Such meta sub-clusters (MSCs) manage availability of leafs while limiting the heart-beat traffic to the respective sub-clusters.

The MSCs can form multiple layers of the hierarchy, with one root MSC at the top. The hierarchy is a balanced tree, where each tree-node depicts a sub-cluster. More of the cluster-nodes may be in the LSCs, and a smaller number of the nodes may fall into the MSCs at various levels. FIG. 1 illustrates an embodiment of a cluster topology 100 with sub-cluster hierarchy. The topology represents a tree with a fan-out of three, which supports a 27 node cluster. Each tree-node (or sub-cluster) can comprise 32 data/processing nodes or components in a tightly coupled cluster model. The tree has a height of three, where a first level comprises a root MSC 110, a second level comprises 3 MSCs 120 (MSC1, MSC2, MSC3) coupled to the root MSC 110, and third level comprises a plurality of LSCs or leafs 130 (L1 to L9) coupled to the MSCs 120. This tree can host 32×32=1024 nodes at each MSC and can scale to 32×32×32=32768 nodes. In another embodiment, the tree may have a different height, e.g., with more than one level of MSCs 120 between the root MSC 110 and the LSCs 130. For example, a cluster tree with a height of 4 can scale to more than one million nodes.

The cluster with the topology 100 can achieve high availability by configuring a degree of high availability. This HA degree is defined as the maximum number of sub-clusters (or a tree-node) which a particular data/processing node is a member of The HA degree reflects the resiliency of the cluster to multiple simultaneous faults in the cluster. Increasing the HA degree, increases the copies of the cluster membership information that are maintained in the cluster. However, this can affect or reduce the run-time performance. A node in the LSC has a HA degree of 1. This means that the node in the LSC belongs only to that sub-cluster. A node in the MSC has a minimum HA degree of 2. This means that the node in the MSC belongs to at least two sub-clusters (including that MSC). A node that belongs to or connects two sub-clusters is referred to herein as a connector node. For example, the entire cluster with the topology 100 has a HA degree of 2, since any connector node is part of two sub-clusters at maximum (e.g., N1 is part of L1 and MSC1).

The HA in each sub-cluster is achieved by tight monitoring (via heart beating) of all nodes in that sub-cluster. The heart-beat message exchange is limited between the nodes within each of the sub-clusters and prevented from reaching nodes in other sub-clusters. Limiting the heart-beat traffic within sub-clusters only improves the scalability of the system. If any node crash is identified or detected, then other nodes in the sub-cluster recover (within sufficient fast response time) to a new membership and remove the crashed node from that sub-cluster. For example, the sub-cluster L1 of the cluster topology 100 includes nodes N1, N1a, and N1b. If the node N1a crashes, then L1 membership layer discovers the crash and recovers the situation by forming a new sub-cluster L1 with nodes N1 and N1b and removing the node N1a from L1. More involved membership maintenance mechanism may be used when the crashed nodes are connector nodes or when multiple nodes crash simultaneously, as described below.

To efficiently manage the cluster membership in a relatively large scale cluster, the cluster can be divided into smaller sub-clusters for independent CML messaging. This ensures that the heart-beating and membership management overhead are localized within the sub-clusters. Token-ring based heart-beat messaging can be used, such as according to a TOTEM protocol. In other embodiments, this HB can be replaced by any other suitable algorithm. For example, another HB algorithm that can be used is an all-peers HB messaging, where each node sends/receives HB messages to/from every other node in the sub-cluster.

The nodes in the cluster can belong to two types of nodes, leaf nodes and connector nodes. A leaf node is a node that is member of only a single sub-cluster. By definition, the HA degree of such nodes is one. The leaf nodes are at the bottom most layer or level of the tree hierarchy. The leaf nodes are part of the LSCs. However, leaf nodes can exist at any higher level of sub-clusters. A connector node is a node that is member of two or more sub-clusters, depending on the HA degree of the cluster. The purpose of connector node is to join two (or more) sub-clusters and provide HA to all the connected sub-clusters using a light-weight membership protocol. One of the sub-clusters is designated as a home cluster for the connector node. If the connector node fails, one of the peers in its home cluster can take the responsibility to find a replacement of the connector node.

In a tightly coupled sub-cluster, a leaf node has the ability to cover or takeover responsibilities of any other leaf node in the sub-cluster, in case of faults or crashes. The leaf node can also be covered by any other leaf in the sub-cluster. The connector node covers any node of its sub-clusters, and is covered by any peer node in its home cluster. Further, a node can be promoted to the capability to cover or takeover a crashed node. Nodes that can be promoted are either leaf nodes in a LSC with a HA degree of 1 or by a node in a MSC with a HA degree less than that of the entire cluster (the maximum HA degree of all the sub-clusters). The maximum HA degree may also be configurable at the time of cluster creation.

Figure 2:
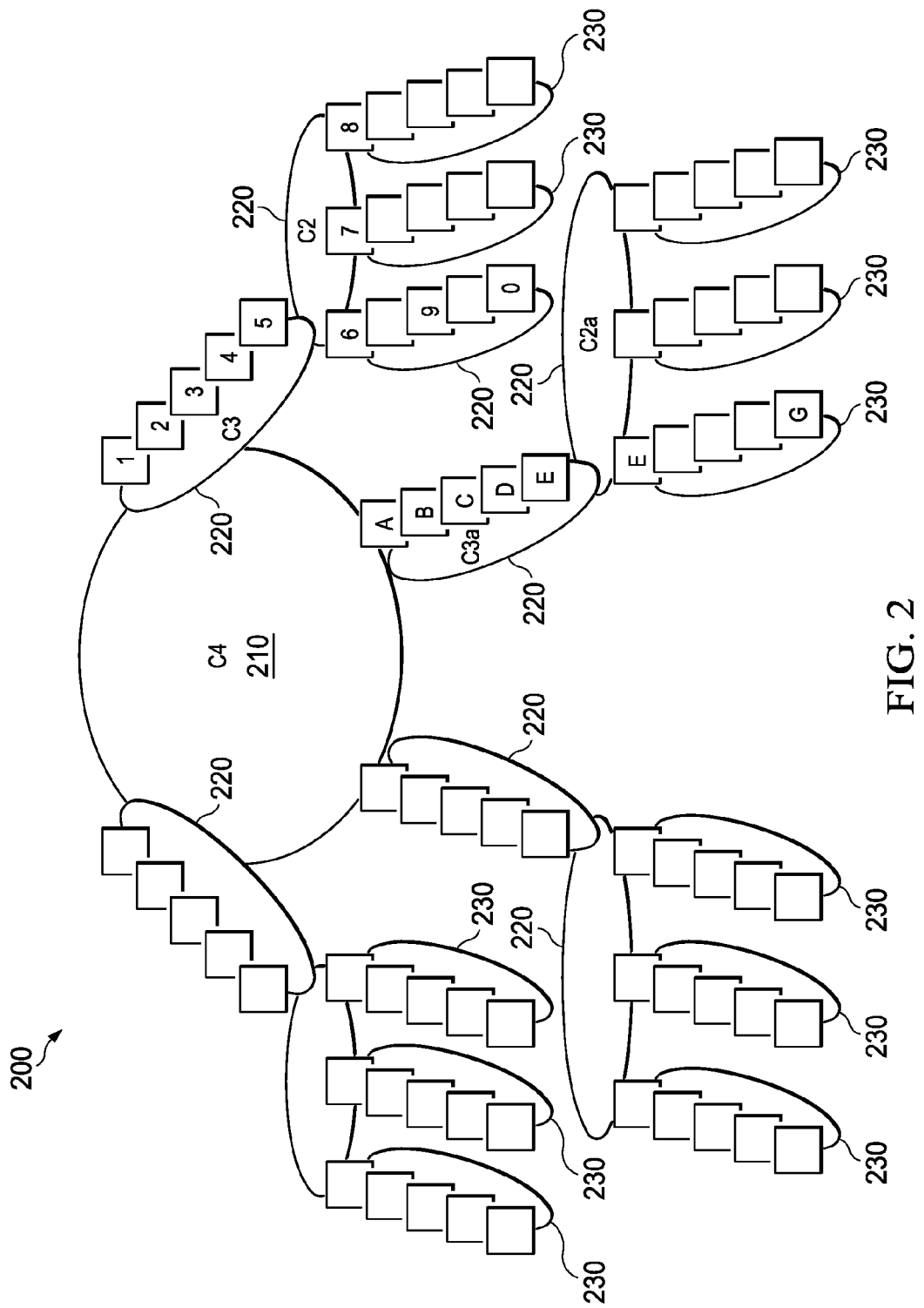
FIG. 2 illustrates an embodiment of a hierarchy for a scalable high availability cluster.

FIG. 2 illustrates an embodiment of a hierarchy 200 for a scalable HA cluster. The hierarchy 200 includes a plurality of sub-clusters include a root MSC 210, MSCs 220 under the root MSC, and LSCs 230. The cluster has a HA degree of 2 (also referred to as two-dimensional (2D) cluster) with a height of 4. Each box in FIG. 2 indicates a node and each ellipse joining a set of nodes indicates a sub-cluster. The nodes are labeled by numbers (1, 2, 3, etc.) and alphabets (A, B, C, etc.). The sub-clusters are labeled as Ci, where 'i' indicates the height of the cluster from the bottom of the tree. For example, C1 represent a LSC 230, C2 represents a MSC 220 at height of 2, and C4 is the root MSC 210 at the height of 4.

In the hierarchy 200, every sub-cluster implements heart-beating and tightly coupled cluster membership management protocols. If a leaf node crashes, any of the peer nodes in the same sub-cluster may take over the failed node's responsibilities. The peer node can take over any of the migratable disk/network (e.g., virtual IP) components and/or software applications of the crashed node. The crashed node is also removed from the sub-cluster to prevent possible data corruptions. If the assumed crashed node did not actually crash, the membership protocol can ensure that cluster integrity is retained. For example, the node 0 in FIG. 2 can take over the node 9 or 6 or vice-versa. Some of the nodes and sub-clusters are left without labeling in FIG. 2 to simplify illustration. Further, some of the sub-clusters are not depicted. For example, for the MSC C3 (with the nodes 1,2,3,4,5) only node 5 is shown as a connector node with sub-cluster C2. However, other nodes in C3 can be connector nodes with other sub-clusters that are not shown.

A connector node such as node 5 maintains information about all of its peers in both sub-clusters of the connector node. For example, node 5 can cover node 4 (in its home cluster) or any of nodes 6, 7, and 8. Node 5 is also covered by its peers in both sub-clusters. For instance, if node 5 crashes, the peers are examined to determine whether any of the peers in the failed node's home cluster are upgradable (e.g. have a lower HA degree than a pre-determined defined maximum). If this condition is true, then one of the nodes is upgraded to replace the crashed node 5. In this example, one of the nodes 2, 3, or 4 is upgraded if they are leaf nodes. If no other home cluster nodes are available or if all of the home cluster nodes have crashed (for instance, all sub-trees of nodes 1 to 5 crashed), then the peer cluster nodes of crashing node 5 can take over by promoting one of the leaf nodes in their sub-cluster tree. For example, the peer node 6 may elect the leaf node 9 to take over the crashed node 5. Further, an upgradable node can be selected based on other criteria, such as load on the node, or one which can minimize re-clustering effort. For example, if node 5 has crashed, replacing it with node 4 may be easier than with node 9, since node 9 would need to be added to two clusters.

If all sub-trees of nodes 1 to 5 and nodes A to E crashed, then there is no direct connectivity information available in the cluster to connect sub-clusters C2 and C2a. In this case, the peers of nodes 1 and A in C4 can notice the crash, but may wait for lower level nodes of C3 and C3a to recover the nodes 1 and A, respectively. If all sub-trees of nodes 1 to 4 and A to D crash, then node 6 can take over node 5 by promoting node 9. Similarly, node F can promote node G to cover node E. Further, nodes 9 and G can connect to C4 to complete the failover process. Because of the cluster hierarchy, such a failover scheme may take longer than typical single node crashes or leaf node crashes (e.g., which impact only one sub-cluster).

If all sub-clusters connected to C4 crash, then there may be no efficient way to establish connectivity between C2 level trees (and hence cluster membership). For example, when C2 level trees promote one of their leaf nodes to connect to C4, they may find that the entire C4 level cluster has crashed. As different C2 level trees have no information about each other, this can result in a forest of (or a group of disconnected) C2 level trees. In such case, all promoted connector nodes send broadcast messages to the rest of the cluster nodes to recreate the new cluster.

Figure 3:
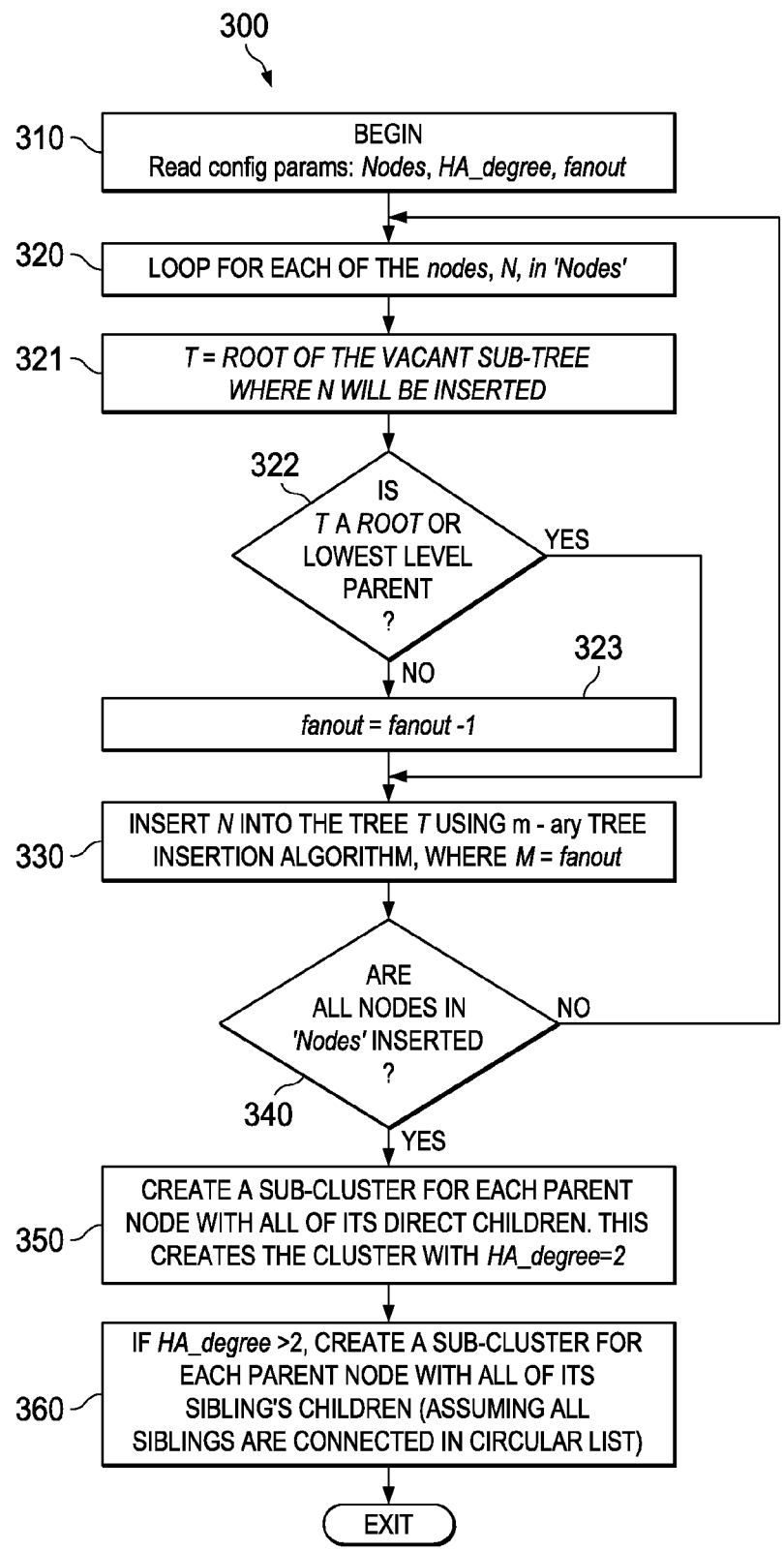
FIG. 3 illustrates an embodiment of a method for creating a high availability cluster tree.

FIG. 3 illustrates an embodiment method 300 for creating a high availability cluster tree, such as shown in the cluster topology 100 and the hierarchy 200. The method 300 starts at step 310 with reading configuration parameters to create the cluster. The parameters can include nodes which is a list of host names that form the cluster, fan-out which is the maximum size for any sub-cluster, HA degree which is the maximum number of sub-clusters that a parent node (connector) joins as member. Steps 320, 321, 322, 323, 330 and 340 include an algorithm that creates an m-ary tree of all nodes. The tree is created one sub-cluster at a time, starting with LSC. This means each sub-tree of the tree is completely filled with new nodes (until the sub-tree reaches its maximum possible fan-out), before adding nodes to other sub-trees. Effectively this builds a Depth first Search Tree (DST, in short). Step 321 checks first vacant sub-tree in a depth first search, where the new node is inserted. Steps 322 and 323 adjust the fan-out by decrementing fan-out by one, for the intermediary tree-nodes. Only the root node which does not have a parent can have complete fan-out number of children. All other intermediary nodes can have only (fan-out −1) children, because each sub-cluster corresponding to a sub-tree is created with the root of the sub-tree and all its immediate children (in step 350). Step 330 uses a standard m-ary tree building algorithm to build the tree.

Once all nodes are inserted into the tree, step 350 creates the basic cluster with HA degree=2. The LSC/MSC sub-clusters are created by starting to explore the tree starting at node Root following a Breadth First Search. For each sub-tree rooted at node T, a sub-cluster $SC_T$ is created with T and all its immediate children. For each node N of the sub-cluster, the HA degree is incremented. If $N_{HA\_degree}=1$, then $SC_T$ is set as home-cluster, e.g., $N_{hc}=SC_T$. Otherwise, $SC_T$ is set as peer-cluster, e.g., $N_{pc}=SC_T$. At the end of step 350, the basic HA cluster is formed with root at node Root. All parent nodes in the tree then have HA degree=2, and all leaf nodes have HA degree=1.

Step 360 creates more sub-clusters to increase the HA degree of the whole cluster if requested so. This can be done in multiple ways depending on the user configuration and/or input. For instance, connector nodes can be added to more sub-clusters, such as to its sibling's clusters. Alternatively, creating sub-clusters can be created with nodes from different sub-trees. In other embodiments, more sophisticated methods can be incorporated to efficiently create redundant sub-clusters or customize the process.

Figure 4B:
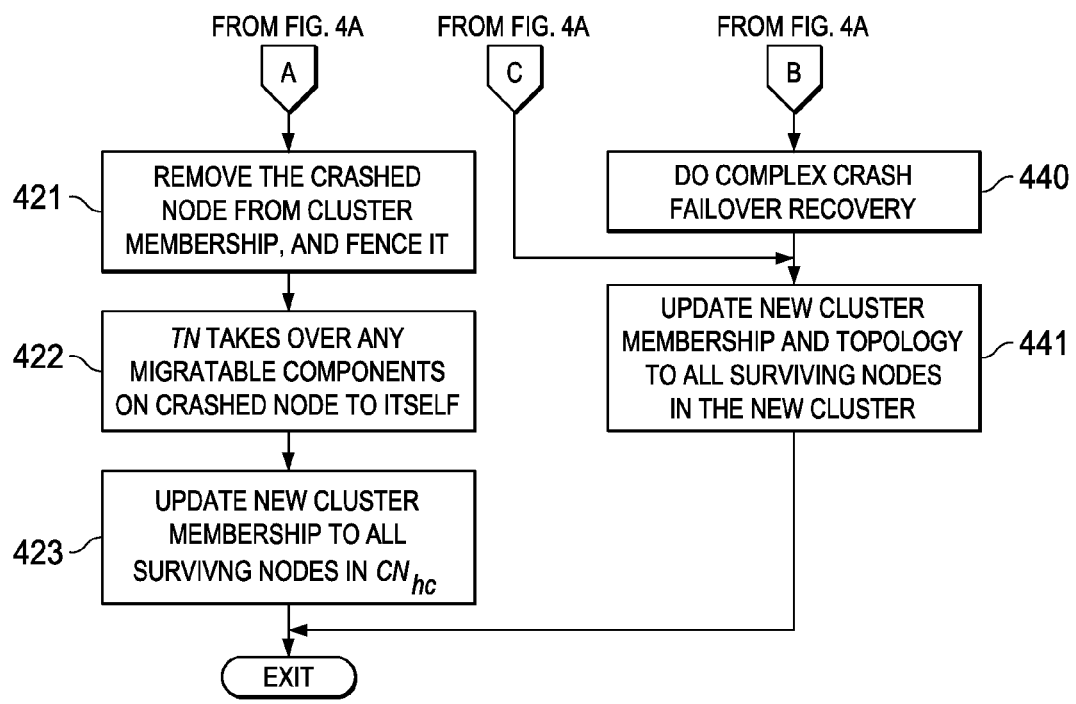

FIGS. 4A and 4B illustrate an embodiment method 400 for taking over a crashed node, such as shown in the cluster topology 100 and the hierarchy 200. The takeover or failover can occur in response to a fault in the cluster system which results in the loss of a processing node (or processor). Such a down-time for a crashed node can happen in two ways. The down-time may be planned down time, such as a node brought down for maintenance (e.g., software/hardware upgrades). The down-time may also be unplanned down time, such as power failure, or faulty devices (e.g., network cards or disks), or software bugs in operating system (OS) or application programs hosted on the node Planned and unplanned down times are similar in nature with regard to failover handling Planned down-times typically have faster failover and recovery times, because it doesn't include failure detection time and various components on the down-node are properly shut down requiring lesser or no recovery time. The method 400 works for both cases. In the case of planned downtime, this algorithm or failover process is manually initiated and runs on current node, curN. For unplanned crashes, curN is the node which detects the failure (with heart-beat loss), and initiates the failover.

The algorithm or method 400 starts on current node, curN, which discovers the crash of node, CN. Step 405 defines curN, CN, and $CN_{hc}$ as CN's home cluster. Step 410 checks if CN is a leaf node. If so, then the takeover process is relatively simpler as it involves the nodes of $CN_{hc}$ only. Step 431 determines if $CN_{hc}$ has a takeover node. Step 432, the takeover node TN is found if $CN_{hc}$ has a takeover node, which can be a configured stand-by node, or any other surviving nodes of $CN_{hc}$. Once TN is identified (step 432), curN hands-off the takeover process to TN at step 434. Step 421 removes the crashed node from the sub-cluster, establishes a new sub-cluster membership, and then fences CN to prevent any unexpected data-corruptions. Step 422 updates the new cluster membership to all nodes in $CN_{hc}$. In step 423, TN does the failover of all migratable components on CN. This takeover includes relocating any floating IP addresses, shared storage/file-systems, and any software applications.

Failure handling for a connector-node shares some of the concepts and procedures explained in the steps above. However, when a connector crashes then all HA degree numbers of sub-clusters are impacted, which contain CN as member. This is because the membership state information of a connector is maintained on all nodes of the sub-clusters it belongs to. This helps in efficient failovers possible for connectors and their home/peer-cluster nodes. Steps 430, 433, 440, and 441 show the steps involved in handling connector failures. In steps 430, 431, and 432, the method 400 first checks whether there are any surviving nodes of $CN_{hc}$. If so, then TN is selected from $CN_{hc}$ and the subsequent failover process is handed-off to TN. The takeover is then implemented as described in explained in steps 421, 422, and 423 above.

If no nodes of $CN_{hc}$ are available, then TN is selected from one of the peer-clusters $\{CN_{pc}\}$ of CN (in step 433). A connector may have multiple peer-clusters depending on HA degree of the cluster, and hence a peer-cluster is represented as a set $\{CN_{pc}\}$. As curN is the node which detected CN's crash, it is more likely that it is part of $\{CN_{pc}\}$. If so, then the method 400 finds TN in the sub-tree, $T_{curN}$, rooted at curN. If TN cannot be found in $T_{curN}$, then all other sub-trees of $\{CN_{pc}\}$ are searched to find a promotable TN. In the event where all sub-clusters of $\{CN_{pc}\}$ and $CN_{hc}$ crashed (which has a substantially low likelihood), then curN belongs to some other sub-cluster unrelated to CN. In such case, a complex crash is declared at step 440. A complex crash recovery is described below.

Once TN is selected, it is promoted in step 434 to a connector as CN is a connector. This involves multiple steps. First, TN is removed from its home-cluster. Next, TN is added as member of $CN_{hc}$ and $\{CN_{pc}\}$. The tree hierarchy is then modified to reflect the positional changes of TN and CN. The new cluster/tree topology is propagated to other nodes of the whole cluster. Once TN is identified, the takeover is implemented as described in steps 421, 422, and 423 above.

Figure 5:
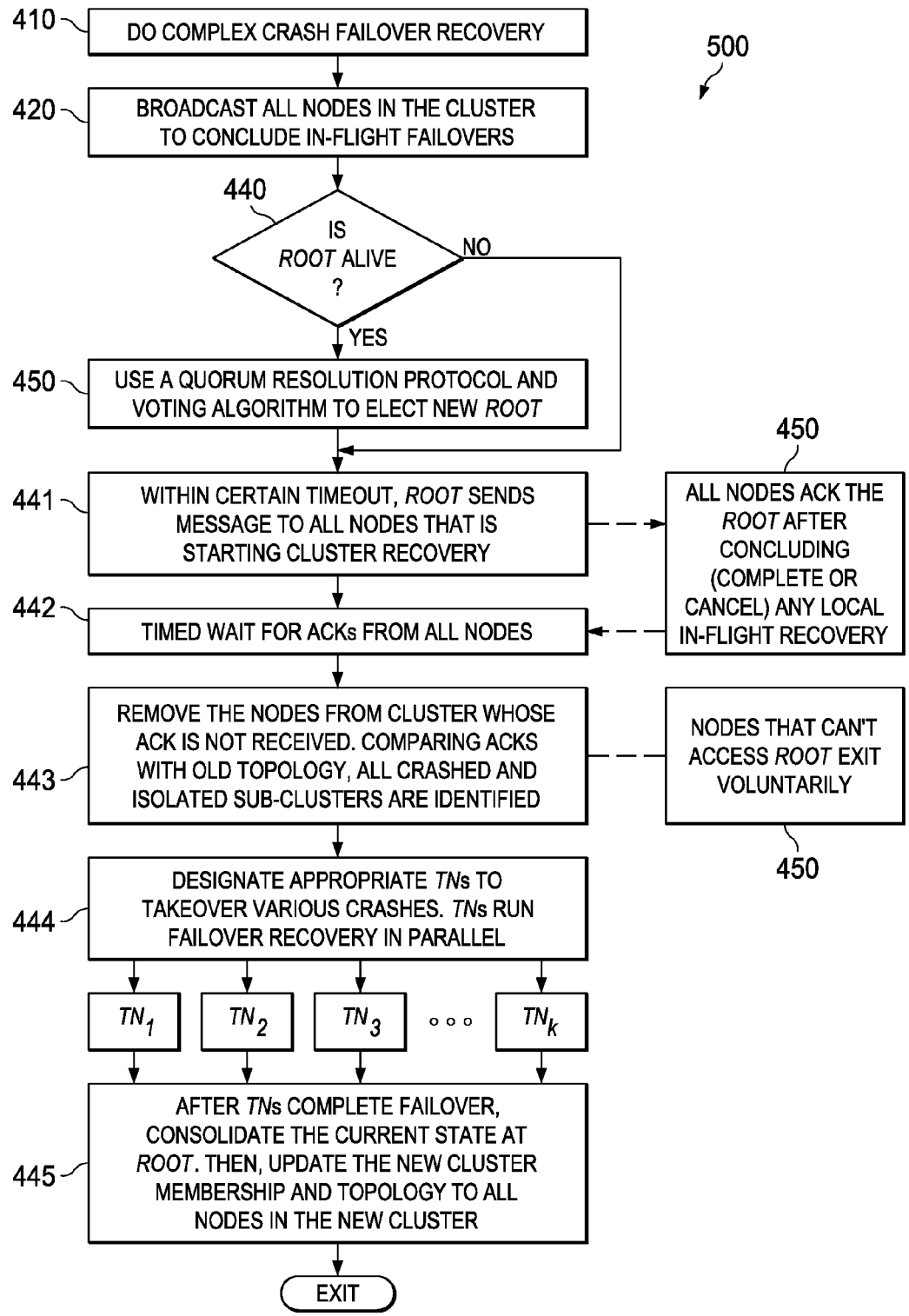
FIG. 5 illustrates an embodiment of a method for crash failure handling.

FIG. 5 illustrates an embodiment method 500 for crash failure handling. The method 500 may be used in case of complex crash recovery steps of the method 400. Complex crash is a situation where multiple sub-clusters crash, which involves at least one connector-node of which home and peer clusters completely crash. Such a situation experiences a state where the currently configured HA degree is not sufficient to recover the failures in the cluster. As node-crash detection algorithms are timeout based, such a complex crash scenario poses too many confusions to the crash-detection and failover algorithms. Hence, additional steps are followed during complex crash recovery.

The steps include, as soon as complex crashes are detected (step 410), informing all nodes in the cluster of the situation (via broadcast in step 420). Any simultaneously running failovers are then completed (or cancelled if possible), and no new local sub-cluster level failovers are initiated. The Root of the cluster takes charge of coordinating the whole cluster recovery. If the Root itself has crashed, then all surviving nodes broadcast to each other to elect a temporary Root to coordinate the failover recovery of the cluster (step 450). The temporary Root connects to all nodes and assesses the global picture of the current topology (steps 441, 450, 442). For example, an ACK feedback mechanism from the nodes to the Root can be used to detect the surviving nodes. Any nodes that cannot be connected to the Root are deleted from the cluster topology (step 433). Conversely, any surviving nodes that cannot reach the Root during complex crashes exit the cluster membership to maintain the integrity of the whole cluster (step 450). All crashes and isolated sub-clusters are identified. A list of TN's is then identified to failover/recover each of the crashes. The identified TN's are coordinated by the Root to run failover recovery, e.g., in parallel (step 444). The Root then publishes the new hierarchy and cluster topology to all nodes in the cluster (step 445).

Figure 6:
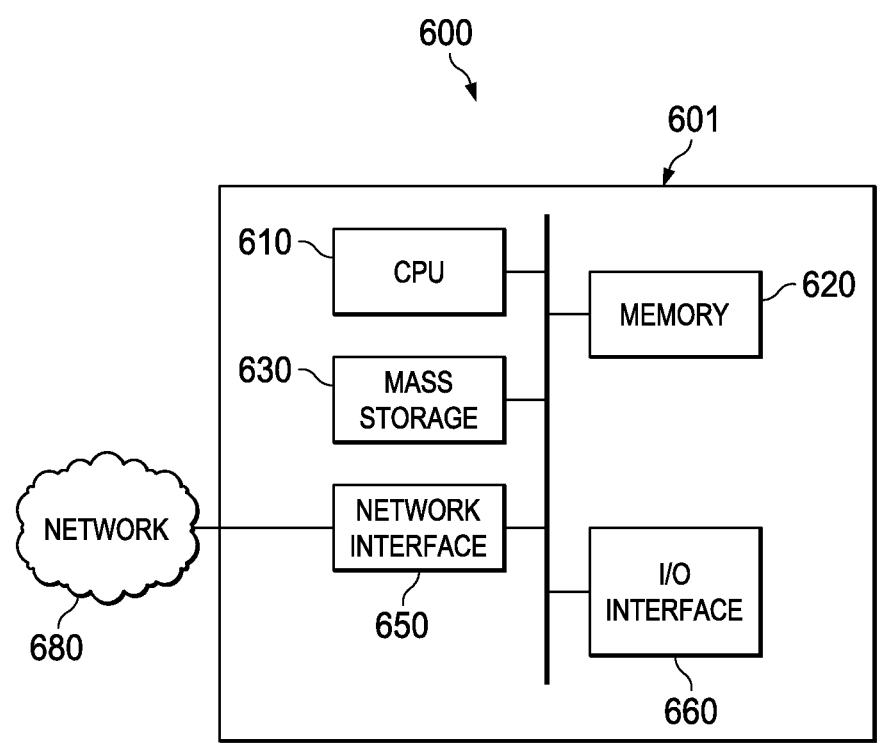
FIG. 6 is a processing system that can be used to implement various embodiments.

FIG. 6 is a block diagram of a processing system 600 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a network interfaces, storage interfaces, and the like. The processing unit 601 may include a central processing unit (CPU) 610, a memory 620, a mass storage device 630, and an I/O interface 660 connected to a bus. The bus may be one or more of any type of several bus architectures including a memory bus or memory controller, a peripheral bus or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for providing a massively parallel processing (MPP) cluster of processing nodes, the method comprising:
   dividing the MPP cluster into a plurality of sub-clusters of processing nodes;
   arranging the sub-clusters of processing nodes into a fan-out tree hierarchy;
   exchanging heart-beat messages between processing nodes in same sub-clusters of processing nodes within limit of each of the corresponding sub-clusters of processing nodes to maintain cluster membership integrity of processing nodes in each of the sub-clusters of processing nodes; and
   actively suppressing inter-sub-cluster heart-beat traffic to prevent heart-beat traffic exchanged between processing nodes in the same sub-cluster of processing nodes from reaching processing nodes in other sub-clusters of processing nodes.

2. The method of claim 1, further comprising:
   detecting a crash of a first processing node in a first sub-cluster of processing nodes;
   assigning a second processing node to take over operations of the crashed processing node; and
   removing the crashed processing node from the first sub-cluster of processing nodes.

3. The method of claim 2, wherein the second processing node is in the first sub-cluster of processing nodes or a second sub-cluster of processing nodes coupled to the first sub-cluster of processing nodes.

4. The method of claim 3, wherein detecting the crash of the first processing node comprises detecting a missing heart-beat message from the first processing node.

5. The method of claim 1, wherein the heart-beat traffic exchanged between processing nodes within the same sub-cluster of processing nodes is communicated according to a token-ring protocol.

6. The method of claim 1, the heart-beat traffic exchanged between processing nodes within the same sub-cluster of processing nodes is communicated using an all-peers heart-beat messaging protocol.

7. An apparatus for a massively parallel processing (MPP) cluster of processing nodes, the apparatus comprising:
   a plurality of data processing nodes distributed in a plurality of sub-clusters of processing nodes and configured to exchange heart-beat messages between each other within limit of each of the corresponding sub-clusters of processing nodes to maintain sub-cluster membership integrity and detect failures in the corresponding sub-clusters of processing nodes,
   wherein the sub-clusters of processing nodes are arranged in a fan-out tree hierarchy, and wherein inter-sub-cluster heart-beat traffic is actively suppressed to prevent heart-beat traffic exchanged between processing nodes in the same sub-cluster of processing nodes from reaching processing nodes in other sub-clusters of processing nodes.

8. The apparatus of claim 7, wherein the sub-clusters of processing nodes include one or more meta sub-clusters (MSCs) each comprising a plurality of connector nodes that couple at least two sub-clusters and a plurality of leaf sub-clusters (LSCs) each comprising a plurality of leaf nodes that exclusively belong to a single respective sub-cluster.

9. The apparatus of claim 8, wherein a leaf node is configured to take over operations of any other leaf node within the same LSC upon failure of the other leaf node.

10. The apparatus of claim 8, wherein the MSCs comprise a plurality of connector nodes that couple the MSCs to at least one LSC, at least one other MSC, or at least one LSC and one MSC.

11. The apparatus of claim 8, wherein a connector node is configured to take over operations of any other processing node in the at least two sub-clusters coupled by the processing node upon failure of the other processing node, and wherein any other processing node within a home sub-cluster selected from the at least two sub-clusters is configured to take over operations of the connector node upon failure of the connector node.

12. The apparatus of claim 8, wherein the MSCs include a root MSC and a plurality of lower level MSCs each coupled to the root MSC via a respective connector node.

13. The apparatus of claim 12, wherein the lower level MSCs are arranged in a sub-tree hierarchy that couples the root MSC and the LSCs.

14. The apparatus of claim 8, wherein the LSCs is assigned a high availability degree of 1 that reflects a maximum number of sub-clusters that the processing nodes of the LSCs belong to, wherein the MSCs are assigned a high availability degree of at least 2, and wherein the MPP cluster is assigned a high availability degree equal to a maximum high availability degree of the MSCs.

15. The apparatus of claim 8, wherein a connector node maintains membership information about all other processing nodes in all the sub-clusters coupled by the connector node.

16. An apparatus comprising:
   a processor; and
   a non-transitory computer readable storage medium storing programming for execution by the processor, the programming including instructions to:
   divide the MPP cluster into a plurality of sub-clusters of processing nodes;
   arrange the sub-clusters into a fan-out tree hierarchy;
   exchange heart-beat messages between processing nodes in same sub-clusters of processing nodes within limit of each of the corresponding sub-clusters to maintain cluster membership integrity of processing nodes in each of the sub-clusters of processing nodes; and
   actively suppress inter-sub-cluster heart-beat traffic to prevent heart-beat traffic exchanged between processing nodes in the same sub-cluster of processing nodes from reaching processing nodes in other sub-clusters of processing nodes.

17. The apparatus of claim 16, wherein the programming further includes instructions to:
   detect a crash of a first processing node in a first sub-cluster of processing nodes;
   assign a second processing node to take over operations of the crashed processing node; and
   removing the crashed processing node from the first sub-cluster of processing nodes.

18. The apparatus of claim 17, wherein the second processing node is in the first sub-cluster of processing nodes or a second sub-cluster of processing nodes coupled to the first sub-cluster of processing nodes.

19. The apparatus of claim 17, wherein the instructions to detect the crash of the first processing node includes instructions to detect a missing heart-beat message from the first processing node.

20. The apparatus of claim 16, wherein the heart-beat traffic exchanged between processing nodes within the same sub-cluster of processing nodes is communicated according to a token-ring protocol.

21. The apparatus of claim 16, the heart-beat traffic exchanged between processing nodes within the same sub-cluster of processing nodes is communicated using an all-peers heart-beat messaging protocol.

* * * * *